United States Patent [19]

Jennings

[11] Patent Number: 4,771,595

[45] Date of Patent: Sep. 20, 1988

[54] ROUND BALER WITH ROLLERS AND BELTS

[75] Inventor: Richard E. Jennings, Manheim, Pa.

[73] Assignee: New Holland, Inc., New Holland, Pa.

[21] Appl. No.: 63,390

[22] Filed: Jun. 18, 1987

[51] Int. Cl.⁴ ............................................. A01D 39/00
[52] U.S. Cl. ........................................ 56/341; 100/88; 100/89
[58] Field of Search ....................... 56/341; 100/88, 89

[56] References Cited

U.S. PATENT DOCUMENTS

| 4,306,494 | 12/1981 | Nishibe et al. | 56/341 |
| 4,549,480 | 10/1985 | DeCoene | 56/341 |

FOREIGN PATENT DOCUMENTS

| 0120545 | 10/1984 | European Pat. Off. | |
| 2368214 | 6/1978 | France | 100/88 |
| 2128542 | 5/1984 | United Kingdom | 56/341 |
| 2150492 | 7/1985 | United Kingdom | 100/88 |
| 2152873 | 8/1985 | United Kingdom | 100/88 |
| 2090560 | 10/1985 | United Kingdom | |

Primary Examiner—John Weiss
Attorney, Agent, or Firm—Darrell F. Marquette; Frank A. Seemar; Larry W. Miller

[57] ABSTRACT

A round baler utilizes a combination of rollers and belts arranged to define a generally D-shaped bale starting chamber. An inner course of the belts forms the rear wall of the bale starting chamber while the rollers form the front wall of the bale starting chamber. The belt inner course extends upwardly and forwardly when the chamber is empty and is expandable in length during bale formation.

5 Claims, 1 Drawing Sheet

ROUND BALER WITH ROLLERS AND BELTS

BACKGROUND OF THE INVENTION

This invention relates generally to agricultural balers and, in particular, to such balers typically referred to as "round balers" which form cylindrical bales of crop material.

Two basic types of round balers exist today. The fixed chamber type of round baler forms bales with a soft core and a hard outer shell whereas the expanding chamber type of round baler forms bales with a hard core and a relatively uniform density throughout. An advantage of soft core bales is that they suffer only minimal rotting of the core even if moist crop material is baled. However, a disadvantage of soft core bales is that they tend to sag into an odd shape when stored for extended periods of time. An advantage of hard core bales is that they minimize the sagging problem of soft core bales but a disadvantage of hard core bales is that they have core rotting problems.

Three basic types of bale forming elements have been used in round balers. These are chain and slat aprons, belts and rollers. Each type of bale forming element has advantages and disadvantages. For example, an advantage of chain and slat aprons is that they are capable of starting bales in almost all crop conditions but a disadvantage of these aprons is that they often form bales with rough outer surfaces. An advantage of belts is that they form bales with smooth outer surfaces but belts have a disadvantage in that they have bale starting problems in certain crop conditions. Rollers also have the advantage of forming bales with smooth outer surfaces but they have a disadvantage of resulting in losses of crop material through the gaps between adjacent rollers.

It is an object of the present invention to provide a round baler which incorporates as many advantages as possible of the two basic types of round balers and the three basic types of bale forming elements while minimizing the disadvantages thereof.

SUMMARY OF THE INVENTION

The present invention provides a round baler having a main frame supported by wheels, an auxiliary frame pivotally connected to the main frame for movement between a closed position and an open position, first bale forming means comprised of a series of rollers mounted in the main frame in an arcuate arrangement, and second bale forming means comprised of a plurality of belts movably supported on guide rolls mounted in the auxiliary frame and on a drive roll mounted in the main frame. The second bale forming means has an inner course thereof extending between one of the belt guide rollers and the belt drive roll. This inner course of the second bale forming means cooperates with the series of rolls to define a generally D-shaped bale starting chamber and is expandable in length during bale formation. In the preferred embodiment of the present invention, the inner course of the second bale forming means extends upwardly and forwardly from the one belt guide roll to the belt drive roller when the bale starting chamber is empty such that this inner course forms the rear wall of the bale starting chamber while the series of rollers forms the front wall of the bale starting chamber.

DESCRIPTION OF THE PREFERRED EMBODIMENT

Figure 1:
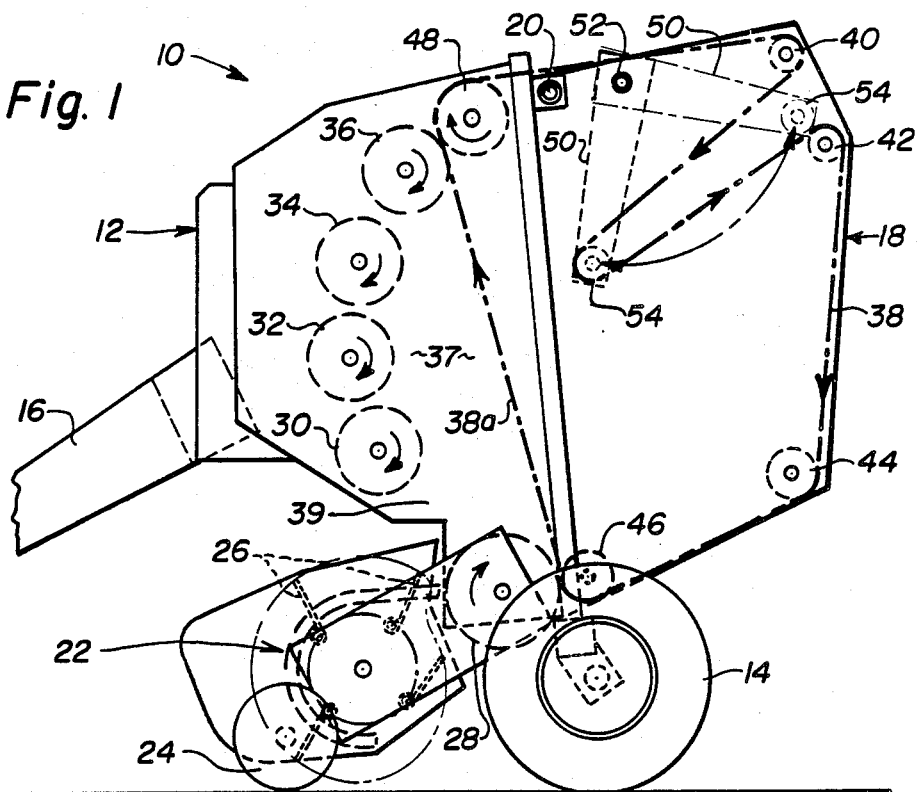
FIG. 1 is a side elevational view of a round baler according to the preferred embodiment of the present invention.
Figure 2:
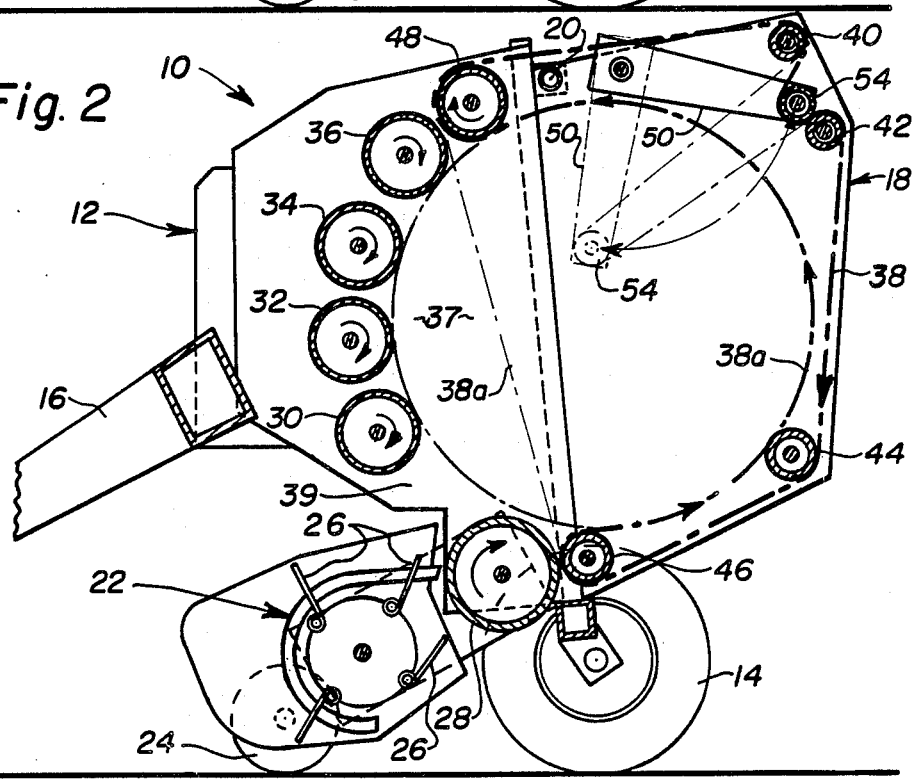
FIG. 2 is another side elevational view, partly in section, of the round baler of FIG. 1.

Referring to FIGS. 1 and 2, a round baler 10 according to the preferred embodiment of the present invention includes a main frame 12 supported by a pair of wheels 14. A tongue 16 is provided on the forward portion of the main frame 12 for connection to a tractor (not shown). An auxiliary frame or tailgate 18 is pivotally connected to the main frame 12 by stub shafts 20 for movement between a closed position shown in FIG. 1 and an open position (not shown). A conventional pickup 22 is mounted on the main frame 12 and is supported by a pair of wheels 24. The pickup 22 includes a plurality of fingers or tines 26 movable in a predetermined path to lift crop material from the ground and deliver it rearwardly toward a floor roll 28 which is rotatably mounted between the sidewalls of the main frame 12.

In accordance with the present invention, first bale forming means comprises a series of rollers 30, 32, 34, 36 extending between the sidewalls of the main frame 12 in an arcuate arrangement. Drive means (not shown) are provided to cause rotation of the rollers 30, 32, 34, 36 in a clockwise direction as indicated in FIGS. 1 and 2. Second bale forming means comprises a plurality of belts 38 supported in a side-by-side arrangement between the sidewalls of the main frame 12 and between the sidewalls of the tailgate 18. The belts 38 are supported on guide rolls 40, 42, 44, 46 rotatably mounted in the tailgate 18 and on a drive roll 48 rotatably mounted in the main frame 12. Further drive means (not shown) are provided to cause rotation of the drive roll 48 which causes movement of the belts 38 along the path and in the direction indicated in FIG. 1 when the round baler 10 is empty. A pair of arms 50 are pivotally mounted on the tailgate 18 by a cross shaft 52 for movement between inner and outer positions shown in phantom and solid lines, respectively, in FIG. 2. Arms 50 carry an additional guide roll 54 for the belts 38. Resilient means (not shown) are provided to normally urge the arms 50 toward their inner position while resisting movement of the arms 50 from their inner position to their outer position.

When the round baler 10 is in the empty condition shown in FIG. 1, the inner course 38a of the belts 38 extending between the guide roll 46 and drive roll 48 cooperates with the rollers 30, 32, 34, 36 to define a generally D-shaped bale starting chamber 37. The inner course 38a of the belts 38 forms the rear wall of the chamber 37 while the rollers 30, 32, 34, 36 form the front wall of the chamber 37. The roller 36 is positioned adjacent the drive roll 48 to strip crop material from the belts 38, and the roller 30 is spaced from the floor roll 28 to form a throat or inlet 39 for the chamber 37. The arms 50 will be urged into their inner position shown in phantom in FIG. 2 in order to start a bale.

As the round baler 10 is towed across a field by a tractor (not shown), the pickup tines 26 lift crop material from the ground and feed it into the bale starting chamber 37 via the throat 39. The crop material is carried rearwardly by the floor roll 28 into engagement with the inner course 38a of the belts 38 which carry it upwardly into engagement with the rollers 30, 32, 34, 36. The crop material is coiled in a counterclockwise direction as viewed in FIG. 2 to start a bale. Continued feeding of crop material into the chamber 37 by the pickup tines 26 causes the inner course 38a of the belts 38 to expand in length around part of the bale as the diameter of the bale grows. The arms 50 rotate from their inner position shown in phantom in FIG. 2 toward their outer position shown in solid lines in FIG. 2 in order to permit expansion of the belt inner course 38a. When a full sized bale has been formed and then wrapped with a suitable material such as twine, the tailgate 18 is raised by conventional means such as hydraulic cylinders (not shown) to its open position for discharging the bale from the round baler 10. Subsequent lowering of the tailgate 18 to its closed position returns the inner course 38a of the belts 38 to the location shown in FIG. 1 since the arms 50 are returned to their inner position shown in phantom in FIG. 2. The round baler 10 is now ready to form another bale.

It should be understood that the peripheral speed of the rollers 30, 32, 34, 36 is substantially the same as the speed of the belts 38. This results in less crop loss, lower power requirements and smoother bale surface.

It will be understood that the combination of rollers 30, 32, 34, 36 and belts 38 used in the round baler 10 of the present invention results in the formation of cylindrical bales with hard cores, hard outer shells, and smooth outer surfaces. This combination of rollers and belts also prevents bale starting problems in almost all crop conditions. Also, crop loss is minimized in the round baler 10 of the present invention due to the location of the rollers 30, 32, 34, 36 above the throat 39.

Having thus described the invention, what is claimed is:

1. A round baler comprising:
a main frame supported by wheels;
an auxiliary frame pivotally connected to said main frame for movement between a closed position and an open position;
first bale forming means comprising a series of rollers rotatably mounted in said main frame in an arcuate arrangement;
second bale forming means comprising a plurality of belts movably supported on guide rolls rotatably mounted in said auxiliary frame and on a drive roll rotatably mounted in said main frame;
said second bale forming means having an inner course thereof extending between one of said guide rolls and said drive roller, said inner course of said second bale forming means cooperating with said series of rollers to define a generally D-shaped bale starting chamber and being expandable in length during bale formation, said inner course of said second bale forming means extending upwardly and forwardly from said one guide roll to said drive roll when said bale starting chamber is empty, said inner course of said second bale forming means forming the rear wall of said bale starting chamber, and said series of rollers forming the front wall of said bale starting chamber; and
a floor roll rotatably mounted in said main frame adjacent said one guide roll and shaped from said first bale forming means to provide an inlet to said bale starting chamber.

2. The round baler of claim 1, further comprising a pickup mounted on said main frame for lifting crop material from the ground and for feeding it into said bale starting chamber via said inlet.

3. The round baler of claim 2, wherein one of said series of rollers is positioned adjacent said drive roll to strip crop material from said plurality of belts.

4. The round baler of claim 1, wherein the peripheral speed of said rollers is substantially the same as the speed of said belts.

5. The round baler of claim 1, wherein said series of rollers is located above said inlet.

* * * * *